US012544526B2

United States Patent
Harrison, IV et al.

(10) Patent No.: US 12,544,526 B2
(45) Date of Patent: Feb. 10, 2026

(54) ANTI-MICROBIAL HEAT AND MOISTURE EXCHANGERS

(71) Applicant: ARTHREX, INC., Naples, FL (US)

(72) Inventors: Robert M. Harrison, IV, North Naples, FL (US); Christopher Bare, Naples, FL (US)

(73) Assignee: Arthrex, Inc., Naples, FL (US)

( * ) Notice: Subject to any disclaimer, the term of this patent is extended or adjusted under 35 U.S.C. 154(b) by 725 days.

(21) Appl. No.: 17/914,568

(22) PCT Filed: Mar. 25, 2021

(86) PCT No.: PCT/US2021/024050
§ 371 (c)(1),
(2) Date: Sep. 26, 2022

(87) PCT Pub. No.: WO2021/195312
PCT Pub. Date: Sep. 30, 2021

(65) Prior Publication Data
US 2023/0158269 A1 May 25, 2023

Related U.S. Application Data

(60) Provisional application No. 63/000,551, filed on Mar. 27, 2020.

(51) Int. Cl.
*A61M 16/10* (2006.01)
*A61M 16/00* (2006.01)
(Continued)

(52) U.S. Cl.
CPC .... *A61M 16/1045* (2013.01); *A61M 16/1055* (2013.01); *A61M 16/1065* (2014.02);
(Continued)

(58) Field of Classification Search
CPC .............. A61M 16/0057; A61M 16/04; A61M 16/0875; A61M 16/1045; A61M 16/1055;
(Continued)

(56) References Cited

U.S. PATENT DOCUMENTS 4,327,717 A * 5/1982 Oetjen .............. A61M 16/1045
261/DIG. 65
5,320,096 A * 6/1994 Hans ................. A61M 16/1045
55/DIG. 35
(Continued)

FOREIGN PATENT DOCUMENTS

WO WO 2005/079913 A1 9/2005
WO WO 2014/178943 A1 11/2014
(Continued)

OTHER PUBLICATIONS

International Preliminary Report on Patentability issued in international application No. PCT/US2021/024050, dated Sep. 22, 2022, 8 pages.
(Continued)

*Primary Examiner* — Joseph D. Boecker
(74) *Attorney, Agent, or Firm* — Lathrop GPM LLP; Lisa Hillman (57) ABSTRACT

A heat and moisture exchanger device comprising a housing containing a microcurrent-generating filter capable of generating a low level microcurrent. A microcurrent-generating filter can reduce the number of living or active microbes.

14 Claims, 3 Drawing Sheets

(51) Int. Cl.
*A61M 16/04* (2006.01)
*A61M 16/08* (2006.01)
*B01D 46/00* (2022.01)

(52) U.S. Cl.
CPC ....... *A61M 16/107* (2014.02); *A61M 16/0057* (2013.01); *A61M 16/04* (2013.01); *A61M 16/0875* (2013.01); *A61M 2205/0205* (2013.01); *A61M 2205/0272* (2013.01); *A61M 2205/0277* (2013.01); *A61M 2205/7509* (2013.01); *A61M 2205/7518* (2013.01); *A61M 2205/7527* (2013.01); *B01D 46/0012* (2013.01); *B01D 46/0027* (2013.01)

(58) Field of Classification Search
CPC ............ A61M 16/1065; A61M 16/107; A61M 2205/0205; A61M 2205/0272; A61M 2205/0277; A61M 2205/7509; A61M 2205/7518; A61M 2205/7527; B01D 46/0012; B01D 46/0027; A61L 2/03
See application file for complete search history.

(56) References Cited

U.S. PATENT DOCUMENTS

| | | | |
|---|---|---|---|
| 5,460,172 A * | 10/1995 | Eckerbom | A61M 16/085 128/205.12 |
| 5,577,494 A * | 11/1996 | Kuypers | D04H 1/54 128/205.12 |
| 5,992,413 A | 11/1999 | Martin et al. | |
| 7,457,667 B2 | 11/2008 | Skiba | |
| 7,662,176 B2 | 2/2010 | Skiba et al. | |
| 7,672,719 B2 | 3/2010 | Skiba et al. | |
| 7,813,806 B2 | 10/2010 | Skiba | |
| 7,904,147 B2 | 3/2011 | Schneider et al. | |
| 8,224,439 B2 | 7/2012 | Skiba et al. | |
| 9,511,215 B2 | 12/2016 | Skiba | |
| 9,731,109 B2 | 8/2017 | Skiba | |
| 10,307,587 B2 | 6/2019 | King et al. | |
| 10,406,347 B2 | 9/2019 | Skiba et al. | |
| 10,532,202 B2 | 1/2020 | Skiba et al. | |
| 10,835,743 B2 | 11/2020 | Nagel et al. | |
| 10,980,995 B2 | 4/2021 | Del Rossi et al. | |
| 11,052,244 B2 | 7/2021 | King et al. | |
| 11,090,482 B2 | 8/2021 | Nagel | |
| 11,160,973 B2 | 11/2021 | Paluszcyk et al. | |
| 11,191,948 B2 | 12/2021 | Skiba et al. | |
| 11,253,015 B2 | 2/2022 | Nagel et al. | |
| 11,484,708 B2 | 11/2022 | Nagel et al. | |
| 11,832,662 B2 | 12/2023 | Nagel et al. | |
| 11,974,617 B2 | 5/2024 | Nagel et al. | |
| 12,017,064 B2 | 6/2024 | Del Rossi et al. | |
| 12,185,774 B2 | 1/2025 | Nagel et al. | |
| 2009/0301478 A1 | 12/2009 | Ohmura et al. | |
| 2010/0319699 A1* | 12/2010 | Wood | B03C 3/155 128/205.12 |
| 2015/0053368 A1* | 2/2015 | Umehara | A61M 16/1075 165/10 |
| 2017/0021122 A1 | 1/2017 | Wisniewski | |
| 2017/0087350 A1* | 3/2017 | Skiba | A61N 1/205 |
| 2019/0336895 A1* | 11/2019 | Inoue | D02G 3/449 |
| 2021/0282478 A1* | 9/2021 | Nagel | A61L 9/22 |

FOREIGN PATENT DOCUMENTS

| | | |
|---|---|---|
| WO | WO 2014/178944 A1 | 11/2014 |
| WO | WO 2014/178945 A1 | 11/2014 |
| WO | WO 2015/187858 A1 | 12/2015 |
| WO | WO 2015/187870 A1 | 12/2015 |
| WO | WO 2015/187871 A1 | 12/2015 |
| WO | WO 2016/196802 A1 | 12/2016 |
| WO | WO 2016/196809 A1 | 12/2016 |
| WO | WO 2017/004582 A1 | 1/2017 |
| WO | WO 2017/035320 A1 | 3/2017 |
| WO | WO 2017/099973 A1 | 6/2017 |
| WO | WO 2017/139253 A1 | 8/2017 |
| WO | WO 2017/151715 A1 | 9/2017 |
| WO | WO 2017/189366 A1 | 11/2017 |
| WO | WO 2017/189584 A1 | 11/2017 |
| WO | WO 2018/031637 A1 | 2/2018 |
| WO | WO 2018/132298 A1 | 7/2018 |
| WO | WO 2019/113451 A1 | 6/2019 |
| WO | WO 2020/205862 A1 | 10/2020 |
| WO | WO 2021/006928 A1 | 1/2021 |
| WO | WO 2021/183164 A1 | 9/2021 |
| WO | WO 2021/183171 A1 | 9/2021 |
| WO | WO 2021/183209 A2 | 9/2021 |
| WO | WO 2023/060061 A1 | 4/2023 |

OTHER PUBLICATIONS

International Search Report by the International Searching Authority issued in international application No. PCT/US2021/024050, dated Jun. 8, 2021, 2 pages.

Written Opinion of the International Searching Authority issued in international application No. PCT/US2021/024050, dated Jun. 8, 2021, 7 pages.

\* cited by examiner

ANTI-MICROBIAL HEAT AND MOISTURE EXCHANGERS

PRIORITY

This application is a 371 of International Application No. PCT/US2021/024050, filed Mar. 25, 2021, which claims the benefit of U.S. provisional Patent Application No. 63/000,551 filed Mar. 27, 2020, the disclosures of which are incorporated by reference herein in their entireties.

BACKGROUND

Heat and moisture exchangers ("HMEs") are devices that can be used to passively heat and humidify inspired gas. HMEs collect heat and moisture from a patient's expired gas and return it to the patient during the following inspiration. HME devices can include both a heat exchanger for storing heat from expired air, and a substrate to retain moisture. A portion of the stored heat and moisture is returned to the patient upon inhalation. Methods are needed in the art to ensure that gas and moisture delivered to a patient is free of contaminants including fungi, viruses, and bacteria.

SUMMARY

An embodiment provides a heat and moisture exchanger device comprising a housing containing a microcurrent-generating filter capable of generating a low level microcurrent. The microcurrent-generating filter can comprise a first array comprising a pattern of microcells or dots formed from a first conductive material and a second array comprising a pattern of microcells or dots formed from a second conductive material. The first array and second array can be supported by a substrate. The first array and the second array can each comprise a discrete circuit. The first array can comprise a pattern of microcells or dots formed from silver and the second array can comprise a pattern of microcells or dots formed from zinc. The first array and the second array can generate a current of 1 to 400 micro-amperes. The microcurrent-generating filter can comprise one or more slits or openings. The housing can comprise one or more ports or valves. A first port can be a ventilator-side port that can be configured to be coupled to an outlet of a ventilator or other medical device and a second port can be a patient-side port configured to be coupled to a mask or tube. The patient-side port can be configured to be connectable to an endotracheal tube. In an embodiment, gas can flow can be from the ventilator-side port to the patient-side port. The substrate can comprise polyester, cotton, cellulose, fabric, a cellulose-based material, a fibrous material, foam, or paper. The substrate can be treated with a hygroscopic material. The microcurrent-generating filter can transfer retained moisture and heat to a gas.

Another embodiment provides a method of treating a patient comprising placing the heat and moisture exchange devices described herein between a gas supply and the patient's nasal passages, trachea, larynx, or lungs, and delivering a gas to the patient. A heat and moisture exchange device can be connected to a ventilator or breathing circuit, such that gas delivered from the ventilator or breathing circuit to the patient passes through the heat and moisture exchange device.

DETAILED DESCRIPTION

To provide gas with a desired humidity and temperature to a patient, an HME device can be connected to a ventilator or breathing circuit. Ventilators and breathing circuits can be used to assist in patient breathing. Ventilators and breathing circuits can provide mechanical assistance to patients who are having difficulty breathing on their own. During surgery, medical procedures, and illnesses a patient can be connected to a ventilator for the provision of respiratory gases. HMEs can also be used in tracheostomy or laryngectomy patients. In these patients an HME can replicate the functions of the nose and upper airways to improve respiratory functions.

Humidification and warming of inspired gases can be necessary when therapeutic respiratory devices are used. The temperature and humidity of the gas introduced into a patient from a therapeutic respiratory device can match the inspiratory conditions occurring at the point of entry into a patient's respiratory system. If the level of humidity is less than this level, a humidity deficit may be produced. If the level of humidity is greater than this, fluid overload and patient discomfort may result. High or low inspired gas temperatures can undesirably elevate or depress a patient's body temperature. Gases delivered to the nose and mouth can be heated and humidified to room conditions. For example, gases delivered to the nose and mouth using HME devices described herein can be about 18, 20, 22, 24, 26, or 28° C. or more and at about 30, 40, 50, 60, 70% or more relative humidity. Gases delivered to the trachea using HME devices described herein can be about 26, 28, 30, 32, 36° C. or more and at about 70, 80, 90, 85, 99% or more relative humidity. Gases delivered to the lungs using HME devices described herein can be about 26, 28, 30, 32, 36, 37, 38, 40° C. or more and at about 70, 80, 90, 85, 99. 99.5, 99.9% or more (e.g., 100%) relative humidity.

The use of HME devices described herein in mechanical ventilator systems can reduce exposure to airborne pathogens such as bacteria, fungi, and viruses and other contaminants for both the patient and healthcare workers. In ventilator systems, an HME comprising one or more microcurrent-generating filters ("MCGFs") can be used to both filter the air contaminants and to provide a passive method of heating and moisturizing the air provided to the patient. MCGFs can be effective in reducing or eliminating pathogens such as bacteria, fungi, and viruses, including coronaviruses. Given the usage of ventilators in many respiratory virus treatments, incorporating a microcurrent-generating filter into an HME as described herein provides for reduction of microbial transmission, such as virus transmission.

In embodiments an HME device can be used to enhance delivery of a gas, e.g., oxygen or air, to a patients with a tracheostomy or laryngectomy. In other embodiments, an HME device can connect to one or more medical devices to aid in a patient's breathing. An HME can prevent patient complications due to drying of the respiratory mucosa and enhance the protection against bacteria, fungi, and bacteria. In an example, a medical device is a ventilator circuit and an endotracheal tube.

Figure 1:
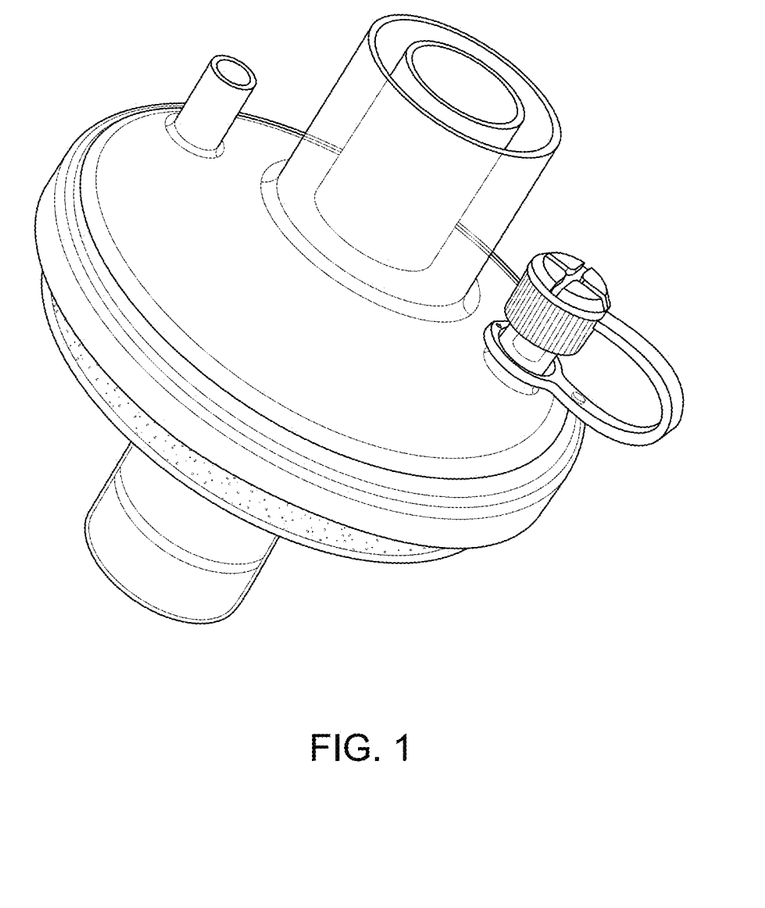
FIG. 1 shows an example of a heat and moisture exchange device housing.

In an example, an endotracheal tube can be placed externally between an outside gas provided by a ventilator circuit and the patient's gas intake at a tracheotomy tube. Exhaled gas from the patient can enter an HME (FIG. 1) and be directed across a MCGF. A substrate of the MCGF can absorb and retain moisture from the exhaled gas. On inspiration, humidified and warmed gas is then breathed in by the patient, thus achieving some of the effect of the natural nasal passage. The ebb and flow of gas across the surface of the MCGF allows a recurring transference of moisture from the patient's exhaled gas to the HME and back to the patient. More specifically, the water vapor contained in the patient's exhaled gas, which is saturated at the temperature of the patient, condenses on the MCGF in the HME, which is heated substantially to the body temperature, either passively or actively. Inhaled gas, arriving at the temperature of the ambient gas, is warmed and takes up moisture in contact with the MCGF, which is at a higher temperature and contains the condensed moisture, before traveling into the patient's lungs with inhalation. An HME can therefore provide humidification warming and filtration of gas and moisture.

Microcurrent-Generating Filter

A microcurrent-generating filter (MCGF) is a porous device comprising conductive materials that permit the flow of electric charges, through which gas and moisture can pass. An MCGR can have inherent electric activity. Conductive materials can be applied to a non-conductive substrate to form at least two arrays. An array of embedded microcells can generate low-level microcurrents at an MCGF surface in the presence of moisture and can exhibits advanced antimicrobial properties on gasses or liquids passing through. More specifically, microcells, made of differing conductive materials (e.g., silver and zinc) and located on a non-conductive substrate, generate electrical microcurrents when activated by conductive fluids, such as water or moist inhalable gases delivered in a patient's breath. These microcurrents provide broad-spectrum antimicrobial protection of the inhaled gas and moisture, by filtering and/or inactivating or killing bacteria, fungi, and viruses before delivery to a patient.

An MCGF can be located within an HME housing (FIG. 1), as designed for passive humidification applications in anesthesia, respiratory care, and critical care. One or more MCGFs can be positioned between a ventilator-side port and a patient-side port within the HME housing.

Figure 3:
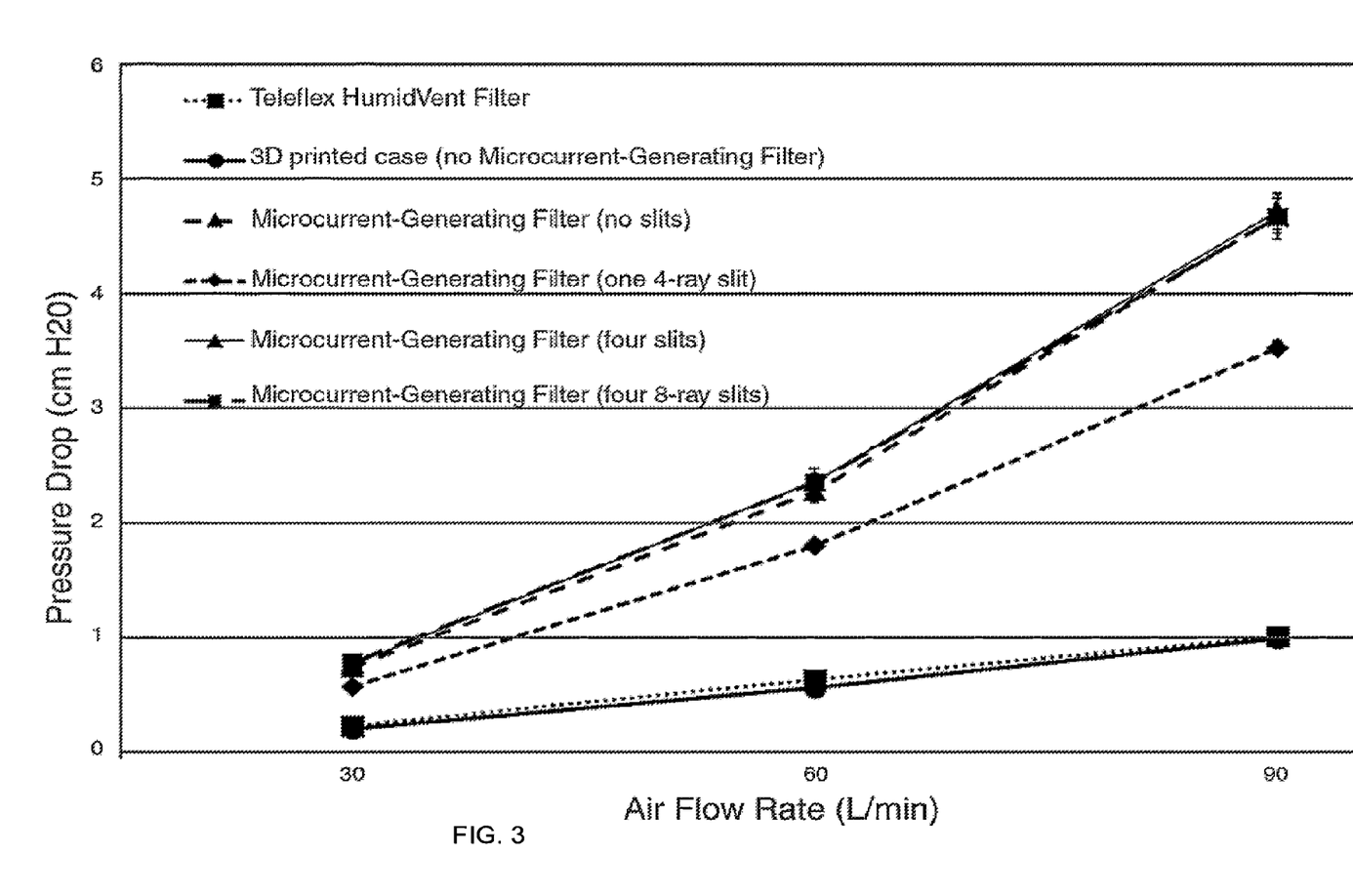
FIG. 3 shows an MCGF filter pressure drop as a function of input airflow rate.

An MCGF can contain one or more discontinuous regions (e.g., 1, 2, 3, 4, 5, or more), such as holes, openings, slits, or the like. The discontinuous region can be centered on the MCGF, entirely within the perimeter of the filter, or it can extend from the center to the perimeter of the filter. In an embodiment, an MCGF can have 1, 2, 3, 4, 5, 6, 7, 8, or more slits, 1, 2, 3, 4, 5, 6, 7, 8, or more ray-slits (e.g., 2 or more slits that cross each other to make an X shape, a cross shape, or a star shape). See e.g., FIG. 3. The holes, openings, slits, or the like can be about 0.01, 0.05, 0.1, 0.25, 0.5, 0.75, 1.0, 1.5, 2.0, 2.5, 3.0, 3.5, 4.0, 4.5, 5.0 mm or more in size or diameter.

An MCGF comprises a non-conductive substrate, which can act as a condensation and absorption surface. A substrate can comprise absorbent textiles or fabrics (e.g., polyester (e.g. FAB-71) or cotton), cellulose, cellulose-based materials, fibrous materials, foam, foam-based materials, paper, or any other suitable material.

A substrate can be untreated or treated with, for example, one or more hygroscopic materials such as calcium chloride or aluminum chloride. In an embodiment a substrate can be coated or saturated with a hygroscopic material.

A substrate can comprise one or more microcells or dots capable of generating a low level microcurrent to aid in microbial resistance, while maintaining acceptable airflow. Microcells or dots may comprise similar or dissimilar conductive materials.

MCGF can comprise two or more arrays. For example, an MCGF can comprise a first array comprising a pattern of microcells or dots formed from a first conductive material and a second array comprising a pattern of microcells or dots formed from a second conductive material. MCGFs can further comprise three, four, five, six or more arrays of microcells or dots.

Each of the one or more arrays can each comprise a discrete circuit, meaning that each array is separate from each other array. The two or more arrays can spontaneously generate a microcurrent, which has anti-microbial properties.

A group or array of microcells or dots are discrete deposits of dissimilar reservoirs that can function as at least one battery cell or electrode. Microcells or dots are a deposit of conductive materials of any suitable size or shape, such as squares, circles, triangles, octagons, hexagons, pentagons, lines, etc. In an embodiment, the microcells or dots comprise an electrically-conductive material, for example, an electrically conductive hydrogel, metal, electrolyte, superconductor, semiconductor, plasma, non-metallic conductors (e.g., graphite and conductive polymers), or combinations thereof. Electrically conductive metals include, for example, silver, copper, gold, aluminum, molybdenum, zinc, lithium, tungsten, brass, carbon, nickel, iron, palladium, platinum, tin, bronze, carbon steel, lead, titanium, stainless steel, mercury, Fe/Cr alloys, or combinations thereof.

In some embodiments, microcells or dots can comprise a clear conductive material, for example, indium tin oxide, other transparent conductive oxides, conductive polymers, metal grids, carbon nanotubes, graphene, and nanowire thin films.

Microcell or dot sizes and concentrations can be varied to allow for changes in the properties of the electric field providing, for example, an electric field of between approximately 0.5-5.0V at a MCGF device surface with a resistance of about 100 to 100K ohms. In certain embodiments the pattern of microcells or dots can control the watt density and shape of the electric field.

In some embodiments, microcells or dots can comprise shapes including circles, polygons, lines, zigzags, ovals, stars, or any suitable variety in order to customize surface electric field shapes, strength, or depth of penetration.

In certain embodiments a first conductive element and a second conductive element (dissimilar elements, for example zinc and silver) can create an electric field with a desired voltage.

In an embodiment a conductive metal solution can be used as an ink or paint to form each microcell or dot. Therefore, printing devices such as inkjet or 3D printers can be used to make the MCGFs described herein.

In an embodiment, microcells or dots can be applied onto a non-conductive substrate to create a pattern, such as an array or multi-array of microcells or dots. A MCGF can be contacted with water, bodily fluids, or an electrolytic solution, such as sodium chloride in water for activation. The moisture from a patient's breath can activate a MCGF.

In an embodiment, a MCGF can be formed of a first array comprising a pattern of microcells or dots formed from silver and a second array comprising a pattern of microcells or dots formed from zinc. An array is a pattern or patterns of microcells or dots that make up electrodes on a substrate. Arrays can be designed to vary the microcurrent. For example, the strength and shape of the field or microcurrent can be altered be altering the array.

In an embodiment, the difference of the standard potentials of microcells or dots made up of different conductive materials can be about 0.05 V, 0.5 V, 1.0 V, 5.0 V, or more. In an embodiment, the difference of the standard potentials of the microcells or dots can be less than about 5.0 V, 1.0 V 0.5 V, or 0.05 V. In an embodiment the substrate can produce a low level micro-current of about 1, 5, 10, 15, 50, 100, 150, 200, 300, 400, 500, 600, 700, 800, 900, 1,000 micro-amperes or more. In an embodiment the substrate can produce a low level micro-current of about 1,000, 900, 800, 700, 600, 500, 400, 300, 200, 150, 100, 50, 15, 10, 5, 1, micro-amperes or less. In an embodiment a low level micro-current is about 1 to about 1,000 micro-amperes, about 1 to about 700 micro-amperes, about 1 to about 500 micro-amperes, about 1 to about 400 micro-amperes, or about 1 to about 300 micro-amperes.

In an embodiment, microcells or dots can adhere or bond to the substrate with the use of a biocompatible binder that is mixed with each of the conductive materials (e.g. zinc and silver). Once the conductive solutions dry or cure, the patterns of microcells or dots can maintain their relative position on the substrate. The conductive solutions can be applied onto substrate so that there is an array of alternating microcells or dots that are spaced about 0.01, 0.1, 0.25, 0.5, 0.75, 1.0, 1.5, 2.0, 2.5 mm or more apart on the surface of a substrate. In some embodiments, the conductive materials do not mix or contact each other.

Suitable binders include, for example, any biocompatible liquid material that can be mixed with the conductive material to create a conductive solution that can be applied as a thin coating to a substrate. Examples include solvent reducible polymers.

To maximize the number of microcells or dots, a pattern of alternating microcells or dots of a first conducting material (e.g., silver) and microcells or dots of a second conducting material (e.g. zinc) can create an array of electrical currents across the substrate. In an example, a pattern can have each microcell or dot of a first conducting material equally spaced from four microcells or dots of the second conducting material, and each microcell or dot of a second conducting material equally spaced from four microcells or dots of the first conducting material. The first microcell or dot can be separated from the second microcell or dot by a spacing. The first microcells and second microcells can be repeated to make a design. Numerous repetitions of the designs result in a pattern. Each of the first and second microcells or dots can have different sizes or masses. In an example, a silver design can have about 1.5, 2.0, or 2.5 times as much mass as each zinc design. In an embodiment the silver designs are about 0.1, 0.5, 0.75, 1.0, 1.25, 1.5 or more millimeters from each of the closest four zinc designs, and vice-versa. Any pattern or array that alternates the two or more different types of microcells or dots can be used.

In an embodiment, alternative patterns can use at least one line design. In a first pattern, the first type of microcell or dot (e.g., silver) is round and the second type of microcell or dot (e.g., zinc) is a line. When repeated, the designs define a pattern of parallel lines separated by numerous spaced dots. The first microcell or dot can be thicker than the second microcell or dot if the oxidation-reduction reaction requires more metal from a first conductive element than a second conductive element. The lines can be dashed. A second pattern can include silver grid lines that contain zinc masses in the center of each cell of the grid.

An embodiment provides a substrate comprising a first microcell or dot design or array formed from a first conductive liquid that includes a mixture of a polymer and a first conductive material. The mixture is applied onto the substrate as a microcell or dot. A second microcell or dot design or array is formed from a second conductive liquid that includes a mixture of a polymer and a second, different conductive material. The second conductive liquid is applied onto the substrate as a microcell or dot. The second microcell or dot design or array is spaced on the substrate between the first microcell or dot design or array. The second microcell or dot design or array such does not physically contact the second microcell or dot design or array. There is at least one repetition of the first microcell or dot design or array and the second microcell or dot design or array. The at least one repetition of the first microcell or dot design or array is adjacent the second microcell or dot design or array, wherein the at least one repetition of the first microcell or dot design or array and the second microcell or dot design or array, in conjunction with the spacing between the first microcell or dot design or array and the second microcell or dot design or array, defines at least one pattern for spontaneously generating at least one electrical microcurrent when introduced to a liquid such as an electrolytic solution. Therefore, microcells or dots can have a mean diameter of about 0.1, 0.2, 0.5, 1.0, 2.0, 3.0, 4.0 mm, or more.

In an embodiment, a spacing of approximately 1 mm between each microcell or dot in contact with a conductive fluid can create approximately 1 volt of potential. Closer spacing of microcells or dots can decrease resistance and the current will not penetrate as deeply. Therefore, spacing between the closest conductive materials on the base layer or substrate can be between, for example, 1 μm, 10 μm, 50 μm, 100 μm, 500 μm, 1 mm, 2 mm, 3 mm, 4 mm, 5 mm, 6 mm or more.

Housing

An HME can comprise a housing that contains one or more MCGFs enclosed within the housing. A housing can be made of a rigid material and/or non-porous material such as plastic (e.g., polypropylene or polycarbonate). An MCGF contains a substrate that can retain moisture and heat from the gas that is exhaled from the patient's lungs, and then transfer the captured moisture and heat to the ventilator-provided gas of the inhaled breath.

An HME can comprise a housing having 1, 2, 3, 4, 5, 6 or more ports. In some embodiments an HME comprises a first port, e.g., a ventilator-side port, configured to be coupled to an outlet of a ventilator or other medical device. The housing can also comprise a patient-side port configured to be coupled to a mask, tube, or patient to provide ventilation. The patient-side port can connect to an endotracheal tube. The interior of the HME can comprise a microcurrent-generating filter through which gas (e.g., air or oxygen) can flow. The housing or a structure within the housing forms a path for conducting gas from, e.g., a ventilator-side port through the substrate to a patient-side port, so that all gas passes through the MCGF. See FIG. 1. An HME and its ports or connectors can vary in size and can be designed to fit all attachment devices within a certain product line. Specifically, Universal ISO 5356 connectors (22M/15F, 22F/15M) ensure compatibility with different ventilator and anesthesia systems. A tethered cap can be provided for the one or more ports to keep the ports sealed while not in use and to prevent misplacement. An HME device can be a disposable, single use device.

An HME can have a tidal volume of about 200, 250, 300, 400, 500, 600, 700, 800, 900, 1,000, 1,500 mL or more (or any range between about 200 and 1,500 mL). An HME can have a moisture output of about 33.0, 33.5, 34.0, 34.5, 35.0, 35.5, 36.0, 36.5, 37.0, 37.5, 38.0, 38.5, 39.0 mg/L or more per hour (or any range between about 33.0 and 39.0 mg/L per hour). An HME can have a moisture output of about 31.0, 31.5, 32.0, 32.5, 33.0, 33.5, 34.0, 34.5, 35.0, 35.5, 36.0, 36.5, 37.0, 37.5, 38.0 mg/L or more per 24 hours (or any range between about 31.0 and 38.0 mg/L per 24 hours).

An HME can comprise pressure drop/resistance$^2$ of about 0.03, 0.05, 0.08, 0.10, 0.15, 0.20, 0.25, 0.30, 0.35, 0.40, 0.45, 0.50 kPa or more (or any range between about 0.03 and 0.50 kPa). The kPa can be measured at about 20, 30, 40, 50, 60, 70, 80, 90, 100 or more L/min. An HME can comprise pressure drop/resistance$^2$ of about 0.3, 0.5, 0.8, 1.0, 1.3, 1.5, 1.7, 1.9, 2.0, 2.3, 2.5, 2.7, 3.0, 3.3, 3.5, 3.7, 4.0 cm $H_2O$ or more (or any range between about 0.3 and 4.0 cm $H_2O$. The cm $H_2O$ can be measured at about 20, 30, 40, 50, 60, 70, 80, 90, 100 or more L/min.

Structurally, a housing can have a frontal wall, e.g., a domed or flat frontal wall, and circumferential walls, e.g., circular walls (or other suitable shape), depending from the frontal wall. The housing can have a bottom panel joined to the circumferential walls, an opening formed in the bottom panel, and a plurality of spaced-apart openings formed in the circumferential walls. The housing can contain a patient-side port and a ventilator-side port, one, two, three or more-way valves, and means disposed within the housing to produce nonlinear turbulent air flow within the housing. The housing has a microcurrent-generating filter mounted within the housing between the openings in the circumferential walls through which air flows, wherein moisture and heat from the exhaled air is transferred to the filter and inhaled air is heated and moisturized by the filter and wherein particulates or microbes in the inhaled air can be collected by the filter. In an embodiment the MCGF inactivates or kills the microbes. The housing can produce linear or nonlinear turbulent airflow within the housing.

An MCGF can be disposed within the housing through clips, adhesives, or other means to secure the MCGF within the housing, such that gas entering or leaving the housing must pass through the MCGF. The MCGF can be circular or any other suitable shape and is generally flat with an upper and lower surface of approximately 0.5, 1, 5, 10, 20, 30, 40 mm or more in diameter. An MCGF can be about 0.01, 0.05, 0.1, 0.2, 0.3, 0.4, 0.5, 0.75, 1.0, 2.0, 3.0 mm or more thick. The MCGF can comprise arrays printed on one or both sides of a MCGF. If arrays are printed on one side only, the printed side of the MCGF can be positioned within the housing facing away from a patient-side port. In another embodiment, where the arrays are printed on one side only, the printed side of the MCGF can be positioned within the housing facing towards a patient side port.

Methods of Treatment

An HME device can be used in conjunction with any medical device for delivery of gas, e.g., oxygen to a patient in need thereof. In an embodiment, an HME device is attached to a ventilator circuit and to an endotracheal tube such that gas moving between the ventilator and the patient is directed though the MCGF of the HME device. The HME device can provide a gas, e.g., oxygen, at a desired temperature and humidity to the patient. Additionally, the gas provided to the patient can be devoid or nearly devoid of all active or living bacteria, fungi, and viruses. In embodiments, an HME comprising a MCGF can kill or inactivate 80, 90, 95, 99, 99.9% or more of the bacteria, viruses, or fungi present in gas or moisture to be delivered to a patient.

Methods of using HME devices described herein are provided. For example, an HME device can be mounted on or in a ventilator, tracheotomy tube, stoma, or breathing circuit. The HME device can filter, inactive, and/or kill bacteria, fungi, and viruses within the ventilator, tracheotomy tube, stoma, or breathing circuit. The HME can further control the temperature and moisture content of the air being inhaled and exhaled by the patient.

Provided herein are methods of treating a patient comprising placing an HME device between a gas supply (e.g., air within a room, a gas provided by ventilator or tank) and the patient's nasal passages, trachea, larynx, or lungs, and delivering the gas to the patient. The heat and moisture exchange device can be connected to a ventilator or breathing circuit, such that gas delivered from the ventilator or breathing circuit to the patient passes through the heat and moisture exchange device.

For a tracheostomy or laryngectomy patient, a breathing circuit may merely be the path of gas, e.g., aft from the room to the tracheostomy or laryngectomy, An HME device can be present between the tracheostomy or laryngectomy and the supply of gas or air such that the gas or air passes through the HME as the gas or air enters the stoma of the tracheostomy or laryngectomy patient.

HME devices can be used in nasal continuous positive airway pressure (CPAP) devices, which can be used to treat, for example, obstructive sleep apnea (OSA). The continuous positive airway pressure of a CPAP device acts as a pneumatic splint and prevents upper airway occlusion by pushing the soft palate and tongue forward and away from the posterior oropharyngeal wall.

HME devices can be used in non-invasive ventilation (NIV) systems, which provide ventilatory support to a patient through the upper airways to assist the patient in taking a full breath to maintain adequate oxygen levels in the body by doing some or all of the work of breathing. NIV can be used to treat, e.g., Cheyne-Stokes respiration, chronic obstructive pulmonary disease, muscular dystrophy, and chest wall disorders.

HME devices can be used in invasive ventilation systems, which provide ventilatory support to patients that are no longer able to effectively breathe themselves and may be provided using a tracheostomy tube. Artificial airways keep the patient's natural airway open so that adequate lung ventilation can be maintained.

The compositions and methods are more particularly described below and the Examples set forth herein are intended as illustrative only, as numerous modifications and variations therein will be apparent to those skilled in the art. The terms used in the specification generally have their ordinary meanings in the art, within the context of the compositions and methods described herein, and in the specific context where each term is used. Some terms have been more specifically defined herein to provide additional guidance to the practitioner regarding the description of the compositions and methods.

As used herein, the term "and/or" includes any and all combinations of one or more of the associated listed items. As used in the description herein and throughout the claims that follow, the meaning of "a", "an", and "the" includes plural reference as well as the singular reference unless the context clearly dictates otherwise. The term "about" in association with a numerical value means that the value varies up or down by 5%. For example, for a value of about 100, means 95 to 105 (or any value between 95 and 105).

All patents, patent applications, and other scientific or technical writings referred to anywhere herein are incorporated by reference herein in their entirety. The embodiments illustratively described herein suitably can be practiced in the absence of any element or elements, limitation or limitations that are specifically or not specifically disclosed herein. Thus, for example, in each instance herein any of the terms "comprising," "consisting essentially of," and "consisting of" can be replaced with either of the other two terms, while retaining their ordinary meanings. The terms and expressions which have been employed are used as terms of description and not of limitation, and there is no intention that in the use of such terms and expressions of excluding any equivalents of the features shown and described or portions thereof, but it is recognized that various modifications are possible within the scope of the claims. Thus, it should be understood that although the present methods and compositions have been specifically disclosed by embodiments and optional features, modifications and variations of the concepts herein disclosed can be resorted to by those skilled in the art, and that such modifications and variations are considered to be within the scope of the compositions and methods as defined by the description and the appended claims.

Any single term, single element, single phrase, group of terms, group of phrases, or group of elements described herein can each be specifically excluded from the claims.

Whenever a range is given in the specification, for example, a temperature range, a time range, a composition, or concentration range, all intermediate ranges and subranges, as well as all individual values included in the ranges given are intended to be included in the disclosure. It will be understood that any subranges or individual values in a range or subrange that are included in the description herein can be excluded from the aspects herein. It will be understood that any elements or steps that are included in the description herein can be excluded from the claimed compositions or methods.

In addition, where features or aspects of the compositions and methods are described in terms of Markush groups or other grouping of alternatives, those skilled in the art will recognize that the compositions and methods are also thereby described in terms of any individual member or subgroup of members of the Markush group or other group.

The following are provided for exemplification purposes only and are not intended to limit the scope of the embodiments described in broad terms above.

EXAMPLES

Figure 2:
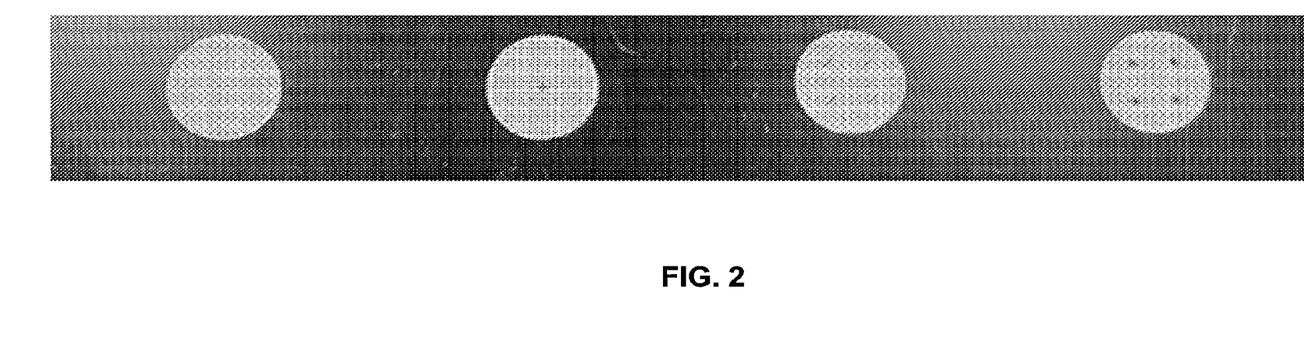
FIG. 2 shows microcurrent-generating filters used for Test Groups 1-4 in the Examples. From left to right: an MCGF containing no slits (Test Group 1); an MCGF containing one centered 4-ray slit (Test Group 2); an MCGF containing four slits (Test Group 3); and an MCGF containing four 8-ray slits (Test Group 4).

In an embodiment, six groups of filters were tested for airflow resistance, two of which were controls and 4 of which comprised microcurrent-generating filters (Test Groups 1-4). See FIG. 2. Test Group 1 comprised a 3D printed filter with an MCGF containing no slits. Test Group 2 comprised a 3D printed filter with an MCGF containing one centered 4-ray slit. Test Group 3 comprised a 3D printed filter with an MCGF containing four slits. Test Group 4 comprised a 3D printed filter with an MCGF containing four 8-ray slits. The differential pressure drop flow rate was 1.06 scfm at 30 L/min, 2.12 scfm at 60 L/min, and 3.18 scfm at 90 L/min. Each filter group containing microcurrents produced higher pressure drops at 30 L/min, 60 L/min, and 90 L/min gas flow rates when compared to the control groups without an MCGF.

Of the filters containing microcurrents, the filter with no slits had a pressure drop of 0.74+/−0.03 at 30 L/min, 2.27+/−0.09 at 60 L/min, and 4.68+/−0.15 at 90 L/min. The filter with four slits had a pressure drop of 0.76+/−0.04 at 30 L/min, 2.36+/−0.08 at 60 L/min, and 4.72+/−0.20 at 90 L/min. The filters with four 8-ray slits had a pressure drop of 0.78+/−0.03 at 30 L/min, 2.35+/−0.11 at 60 L/min, and 4.67+/−0.16 at 90 L/min. The filter with one centered 4-ray slit had the lowest pressure drop, at 0.57+/−0.01 at 30 L/min, 1.80+/−0.03 at 60 L/min, and 3.53+/−0.06 at 90 L/min. See FIG. 3.

The results suggest that the filters containing microcurrents had approximately three times the pressure drop of the filters without microcurrents. They also suggest that slit location can be a consideration for pressure drop outcomes, because one centered slit produced lower pressure drops than the other filters that had four slits near the perimeter. Furthermore, slit placement by the perimeter is likely ineffective in reducing pressure drop, as there were no observable differences between these groups and the filter with an MCGF without slits.

We claim:

1. A heat and moisture exchanger device comprising a housing containing a microcurrent-generating filter capable of generating a low level microcurrent, wherein the microcurrent-generating filter comprises a first array comprising a pattern of microcells or dots formed from a first conductive material and a second array comprising a pattern of microcells or dots formed from a second conductive material, wherein the first array and second array are supported by a substrate.

2. The heat and moisture exchanger device of claim 1, wherein the first array and the second array each comprise a discrete circuit.

3. The heat and moisture exchanger device of claim 2, wherein the first array comprises a pattern of microcells or dots formed from silver and the second array comprises a pattern of microcells or dots formed from zinc.

4. The heat and moisture exchanger device of claim 1, wherein the first array and the second array can generate a current of 1 to 400 micro-amperes.

5. The heat and moisture exchanger device of claim 1, wherein the microcurrent-generating filter comprises one or more slits or openings.

6. The heat and moisture exchanger device of claim 1, wherein the housing comprises one or more ports or valves.

7. The heat and moisture exchanger device of claim 6, wherein a first port is a ventilator-side port that can be configured to be coupled to an outlet of a ventilator, tracheotomy tube, stoma, or breathing circuit, or anesthesia system and a second port is a patient-side port configured to be coupled to a mask or tube.

8. The heat and moisture exchanger device of claim 7, wherein the patient-side port is configured to be connectable to an endotracheal tube.

9. The heat and moisture exchanger device of claim 7, wherein gas can flow from the ventilator-side port to the patient-side port.

10. The heat and moisture exchanger device of claim 1, wherein the substrate comprises polyester, cotton, cellulose, fabric, a cellulose-based material, a fibrous material, foam, or paper.

11. The heat and moisture exchanger device of claim 1, wherein the substrate is treated with a hygroscopic material.

12. The heat and moisture exchanger device of claim 1, wherein the heat and moisture exchanger device is configured to transfer retained moisture and heat to a gas.

13. A method of treating a patient comprising placing a heat and moisture exchanger device between a gas supply and the patient's nasal passages, trachea, larynx, or lungs, and delivering a gas to the patient, wherein the heat and moisture exchanger device comprises a housing containing a microcurrent-generating filter capable of generating a low level microcurrent, wherein the microcurrent-generating filter comprises a first array comprising a pattern of microcells or dots formed from a first conductive material and a second array comprising a pattern of microcells or dots formed from a second conductive material, wherein the first array and second array are supported by a substrate.

14. The method of claim 13, wherein the heat and moisture exchanger is connected to a ventilator or breathing circuit, such that gas delivered from the ventilator or breathing circuit to the patient passes through the heat and moisture exchanger device.

\* \* \* \* \*